(No Model.)
A. L. MONTAGUE.
CHURN.
No. 414,238. Patented Nov. 5, 1889.
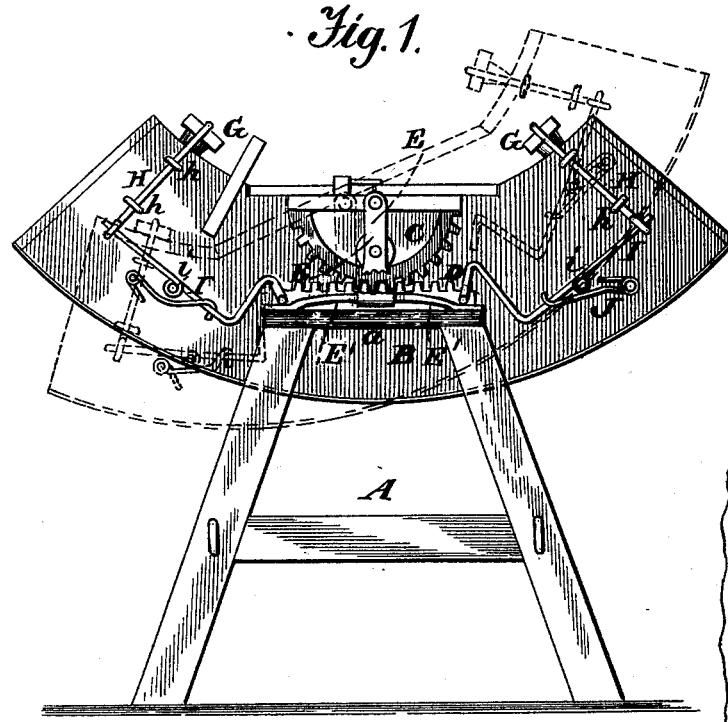
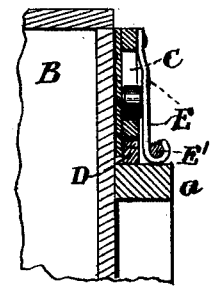
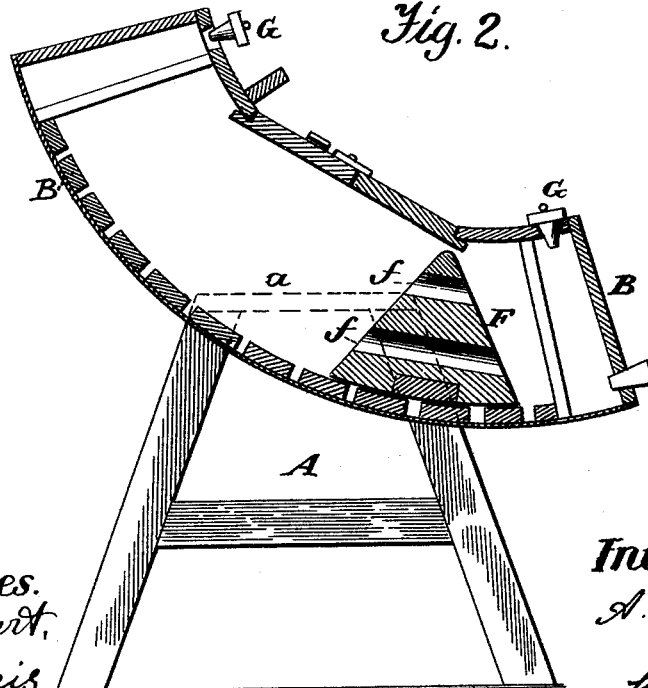
Witnesses.
A. Ruppert,
W. Burris
Inventor:
A. L. Montague
Per
Thomas P. Simpson
Atty

UNITED STATES PATENT OFFICE.

ALFORD LEWIS MONTAGUE, OF ROCHESTER, NEW YORK.

CHURN.

SPECIFICATION forming part of Letters Patent No. 414,238, dated November 5, 1889.

Application filed February 12, 1889. Serial No. 299,598. (No model.)

*To all whom it may concern:*

Be it known that I, ALFORD LEWIS MONTAGUE, a citizen of the United States, residing at Rochester, in the county of Monroe and State of New York, have invented certain new and useful Improvements in Churns; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

The special object of the invention is to make a churn whose rolling motion up, down, and edgewise will serve to agitate the cream and separate the butter very thoroughly from the milk.

Figure 1 of the drawings is a side elevation; Fig. 2, a longitudinal vertical section, and Fig. 3 a detail cross-sectional view to show the relative position of the rods.

In the drawings, A represents the frame, and B the body, the latter supported between the horizontal bars $a$ $a$ by the racks C D and pivoted vertical rod E and horizontal rod E', the movable curved rack C meshing with the horizontal fixed rack D on frame A. The vertical rod E has its upper end pivoted at the middle of the chord of the arc of the curved rack C and its lower end loosely hooked to the horizontal spring-rod E', so as to travel without any unnecessary friction.

The vertical rod E may have a friction-roll running on the inner edge of the rack C, while the spring-rod E' rises and falls with the movements of rod E. Thus it will be seen that these two rods will always keep the racks meshing together.

I am aware that a rack and segmental pinion have been used on a rocking churn, but they are found not to continue uniformly in mesh with each other; hence my object is to overcome this difficulty.

I am also aware that air-valves on churns have been operated by mechanism which caused them to open and close; but I do not believe that any one has ever used my particular means for this purpose.

F is the beater, made, preferably, of triangular form in cross-section and with the transverse holes $f$, through which the cream is forced back and forth. I find the usual rollers under the beater to be unnecessary.

In order to prevent the escape of the cream through the air-holes at the ends of the body B, I employ valves G G, carrying eye-rods H, passing through the guide-staples $h$ $h$ on the frame. Through the eye of each rod H works one end of a lever-pawl I, fulcrumed at $i$ and catching on the frame-bar $a$. This lever-pawl I is so held by the spring J as to lift the valve out of its seat and there hold it until the pawl end of the lever is pressed against the bar $a$. By this means the valves are closed as soon as the air is expelled to prevent the escape of the cream, while the valve is thrown open as soon as the churn movement is reversed by the spring J.

This machine may be used to wash clothes as well as to churn cream, thus serving two very useful purposes in a household.

What I claim as new, and desire to protect by Letters Patent, is—

1. The combination, with the churn-body and the frame thereof, of the curved rack C and pivoted vertical rod E on the churn-body, and the rack-bar D and spring-rod E' on the frame, substantially as and for the purpose described.

2. The combination, with the churn-body and the frame thereof, of the valves G G, movable eye-rods H, levers I, and springs J, all constructed and arranged substantially as and for the purpose set forth.

In testimony whereof I affix my signature in presence of two witnesses.

ALFORD LEWIS MONTAGUE.

Witnesses:
  Z. L. DAVIS,
  PATRICK MCINTYRE.